United States Patent
Arai et al.

(10) Patent No.: US 11,927,826 B2
(45) Date of Patent: Mar. 12, 2024

(54) OPTICAL UNIT

(71) Applicant: NIDEC SANKYO CORPORATION, Nagano (JP)

(72) Inventors: Tsutomu Arai, Nagano (JP); Takeshi Sue, Nagano (JP)

(73) Assignee: NIDEC SANKYO CORPORATION, Nagano (JP)

( * ) Notice: Subject to any disclaimer, the term of this patent is extended or adjusted under 35 U.S.C. 154(b) by 350 days.

(21) Appl. No.: 17/348,765

(22) Filed: Jun. 16, 2021

(65) Prior Publication Data

US 2021/0396954 A1    Dec. 23, 2021

(30) Foreign Application Priority Data

Jun. 22, 2020    (JP) .................................. 2020-106996
Aug. 25, 2020    (JP) .................................. 2020-141808

(51) Int. Cl.
*G02B 7/182*    (2021.01)

(52) U.S. Cl.
CPC .................................. *G02B 7/182* (2013.01)

(58) Field of Classification Search
CPC .... G02B 7/182; G02B 27/646; G02B 7/1821; G03B 17/12; G03B 17/17; G03B 30/00
USPC ........................................................ 359/871
See application file for complete search history.

(56) References Cited

FOREIGN PATENT DOCUMENTS

CN    107357026 A    11/2017

OTHER PUBLICATIONS

Examiner provided machine translation of Shinji, JP 2016061956 (Year: 2016).*
Examiner provided machine translation of Hu et al., CN 107357026 (Year: 2017).*

* cited by examiner

*Primary Examiner* — Balram T Parbadia
*Assistant Examiner* — Rahman Abdur
(74) *Attorney, Agent, or Firm* — HAUPTMAN HAM, LLP

(57) ABSTRACT

An optical unit according to one embodiment including: a reflection portion which reflects an incident light flux, which is made incident from outside, in a reflection direction toward an imaging element from an incident direction; a movable body provided with the reflection portion; a fixed body; a movable mechanism which allows the movable body to move relative to the fixed body; a gimbal mechanism provided with a first support portion which supports the movable body swingably about a first axis; and a bearing mechanism which supports the gimbal mechanism swingably relative to the fixed body about a second axis intersecting the first axis direction.

12 Claims, 13 Drawing Sheets

OPTICAL UNIT

RELATED APPLICATIONS

The present application claims priority to Japanese Application Numbers 2020-106996, filed Jun. 22, 2020, and 2020-141808, filed Aug. 25, 2020, the disclosure of which are hereby incorporated by reference herein in their entirety.

BACKGROUND

Field of the Invention

At least an embodiment of the present invention relates to an optical unit.

Description of the Related Documents

Various optical units have conventionally been used. Among these optical units, an optical unit which allows a movable body, which is provided with a reflection portion that reflects an incident light flux from outside toward an imaging element, to move relative to a fixed body is used. For example, CN107357026A discloses an optical unit which supports a movable body provided with a prism as a reflection portion by means of a plate spring, and allows the prism to move relative to a fixed body.

SUMMARY

In the optical unit configured to move the movable body provided with the reflection portion relative to the fixed body as described above, preferably, the movable body provided with the reflection portion should be displaced greatly relative to the fixed body. This is because such a large displacement can effectively cancel out a camera shake in camera shake correction, for example. However, in a conventional optical unit configured to move a movable body provided with a reflection portion relative to a fixed body, in some cases, it is difficult to greatly displace the movable body relative to the fixed body. For example, in the optical unit of CN107357026A, if the strength of the plate spring is reduced, the movable body can be displaced greatly relative to the fixed body. However, reduction of the strength of the plate spring causes the movable body to easily oscillate, and a drive frequency of the optical unit and a resonance frequency of the movable body may become approximated. For this reason, it is difficult to employ a plate spring of low strength. Also, as the configuration which allows the movable body provided with the reflection portion to move relative to the fixed body, a configuration in which a lens is shifted relative to the reflection portion and a configuration in which the reflection portion is swung by a single axis alone are known. However, with such configurations, it is difficult to displace the movable body greatly relative to the fixed body. Therefore, an object of at least an embodiment of the present invention is to provide an optical unit capable of displacing a movable body provided with a reflection portion greatly relative to a fixed body.

An optical unit of at least an embodiment of the present invention is characterized by comprising: a reflection portion which reflects an incident light flux, which is made incident from outside, in a reflection direction toward an imaging element from an incident direction; a movable body provided with the reflection portion; a fixed body; a movable mechanism which allows the movable body to move relative to the fixed body; a gimbal mechanism provided with a first support portion which supports the movable body swingably about a first axis; and a bearing mechanism which supports the gimbal mechanism swingably relative to the fixed body about a second axis intersecting a direction of the first axis.

According to the present embodiment, there are provided the gimbal mechanism, which is provided with the first support portion which supports the movable body swingably about the first axis, and the bearing mechanism, which supports the gimbal mechanism swingably relative to the fixed body about the second axis intersecting the first axis direction. By providing a configuration which swingably (rotatably) supports the movable body relative to the fixed body with two axes in the gimbal mechanism and the bearing mechanism as described above, the movable body provided with the reflection portion can be displaced greatly relative to the fixed body.

In the optical unit of at least an embodiment of the present invention, the gimbal mechanism is arranged such that the movable body can be swung with reference to a pitching axis that intersects a rolling axis along the reflection direction, and the bearing mechanism is arranged such that the gimbal mechanism can be swung with reference to a yawing axis that intersects the rolling axis and also the pitching axis. By such a configuration, the movable body can be greatly displaced relative to the fixed body with the pitching axis and the yawing axis being swing axes.

In the optical unit of at least an embodiment of the present invention, the movable mechanism may be configured to include a magnet provided on the movable body, and a coil provided at a position opposed to the magnet on the fixed body. By employing such a configuration, the movable mechanism can be formed easily, and it is possible to prevent a cable or the like connected to the coil from obstructing the mobility of the movable body.

In the optical unit of at least an embodiment of the present invention, the movable mechanism may be configured to include a first magnet provided on the reflection direction side of the movable body, and a second magnet which is smaller than the first magnet and is provided on both sides of the movable body in an intersecting direction, which is the direction of intersecting the reflection direction, as the above-described magnet. By employing such a configuration, it is possible to prevent the performance of the movable mechanism from being lowered due to the optical unit being formed thin in the incident direction.

In the optical unit of at least an embodiment of the present invention, the gimbal mechanism may be configured to include a support shaft along the second axis, the bearing mechanism may be configured such that an inner ring is fixed to the support shaft, and an outer ring is fixed to a housing formed in the fixed body, and the fixed body may be configured to include a preload generating member which presses an end portion of the support shaft along the second axis relative to the housing. By employing such a configuration, a preload can be effectively applied to the bearing mechanism with a simple and inexpensive structure.

In the optical unit of at least an embodiment of the present invention, the preload generating member may be configured to be an elastic member. By employing such a configuration, the preload generating member can be easily and inexpensively structured.

In the optical unit of at least an embodiment of the present invention, the elastic member may be configured to be a plate spring. By employing such a configuration, the preload generating member can be easily and inexpensively structured without increasing the number of components.

In the optical unit of at least an embodiment of the present invention, the plate spring may be configured to be fixed to the fixed body at one end portion of the plate spring, and to press, with a contact part provided at an other end portion of the plate spring, the end portion of the support shaft along the second axis relative to the housing. By employing such a configuration, a preload can be applied to a single point on a rotating shaft, and sliding resistance can be minimized even if a strong preload is applied.

In the optical unit of at least an embodiment of the present invention, the plate spring may be configured to be fixed to the fixed body at end portions in a plurality of directions, and to press, with a contact part provided at a position different from the positions of the end portions in the plurality of directions, the end portion of the support shaft along the second axis relative to the housing. By employing such a configuration, a strong preload can be applied to the bearing mechanism, and sliding resistance can also be minimized even if a strong preload that is necessary is applied.

In the optical unit of at least an embodiment of the present invention, the contact part may be configured to include a projection part, and the support shaft may be configured to contact the contact part with a flat surface or a recessed part having a curvature smaller than that of the projection part. By employing such a configuration, a preload can be applied to a single point on the rotating shaft, and even if a center deviation, for example, of a bearing resulting from the component accuracy or the like of the bearing mechanism occurs, it is possible to prevent unnecessary load from being exerted.

In the optical unit of at least an embodiment of the present invention, the support shaft may be configured to include a projection part, and the contact part may be configured to contact the projection part with a flat surface or a recessed part having a curvature smaller than that of the projection part. By employing such a configuration, a preload can be applied to a single point on the rotating shaft, and even if a center deviation, for example, of a bearing resulting from the component accuracy or the like of the bearing mechanism occurs, it is possible to prevent unnecessary load from being exerted.

The optical unit of at least an embodiment of the present invention can displace the movable body provided with the reflection portion greatly relative to the fixed body.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION

Embodiments of the present invention will be described below with reference to the accompanying drawings. Note that in each of the drawings, an X-axis, a Y-axis and a Z-axis represent directions orthogonal to each other, and a view as seen in +X direction and −X direction is referred to as a side view, a view as seen in +Y direction is referred to as a plan view, a view as seen in −Y direction is referred to as a bottom view, a view as seen in +Z direction is referred to as a back view, and a view as seen in −Z direction is referred to as a front view. Further, the +Y direction corresponds to an incident direction D1, which is the direction of incidence of a light flux from outside.

Overview of Device Provided with Optical Unit

Figure 1:
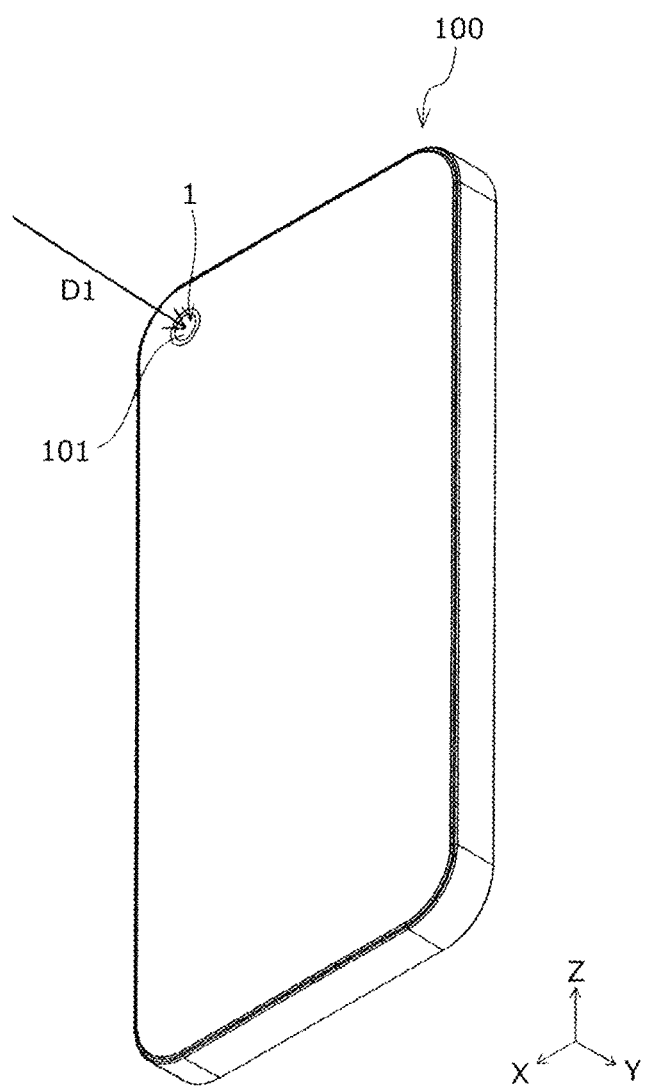
FIG. 1 is a perspective view of a smartphone provided with an optical unit according to one embodiment of the present invention.

FIG. 1 is a schematic perspective view of a smartphone 100 as an example of a device provided with an optical unit 1 of the present embodiment. The optical unit 1 of the present embodiment can be preferably used in the smartphone 100. The optical unit 1 of the present embodiment can be configured to be thin, which is for making the thickness of the smartphone 100 in the Y-axis direction small. However, the optical unit 1 of the present embodiment is not limitedly applied to the smartphone 100, and can be used in various devices that are not particularly limited, such as cameras and videos.

As illustrated in FIG. 1, the smartphone 100 is provided with a lens 101 on which a light flux is made incident. Inside the lens 101 of the smartphone 100, the optical unit 1 is provided. The smartphone 100 is configured to allow a light flux to be incident from the outside in the incident direction D1 via the lens 101, and to enable capturing of a subject image on the basis of the incident light flux.

Overall Configuration of Optical Unit

Figure 2:
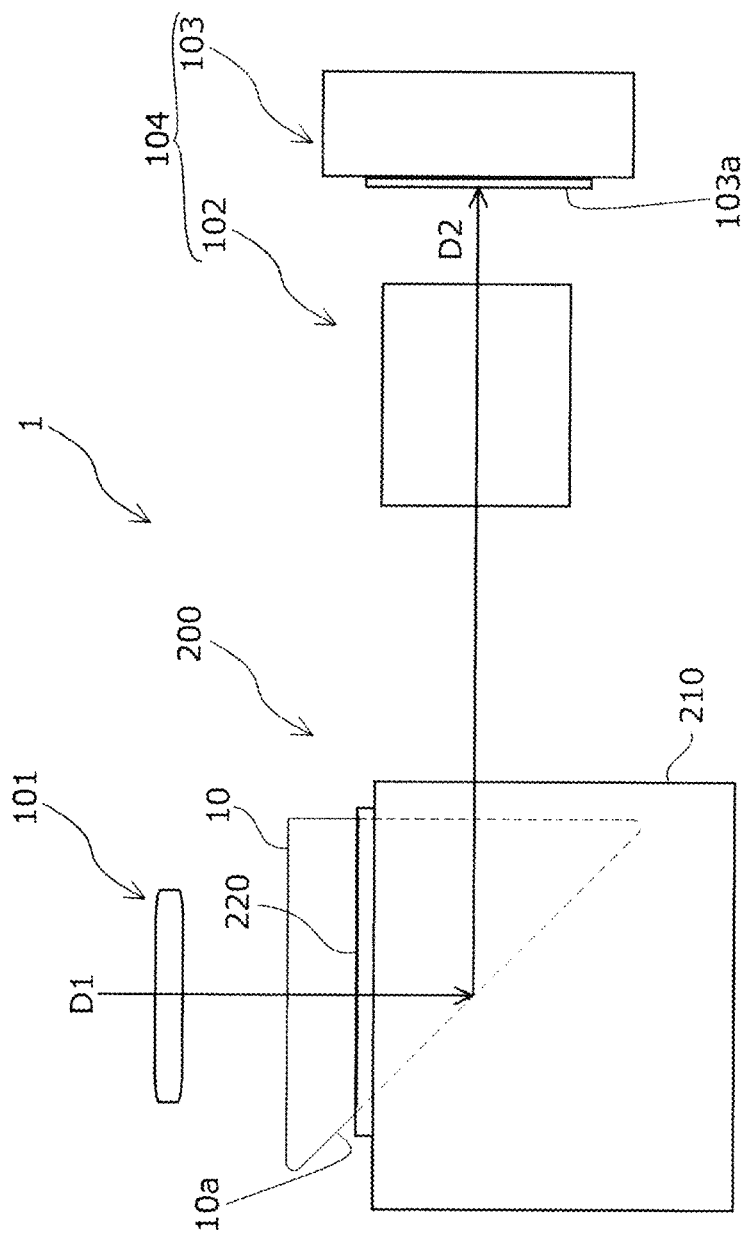
FIG. 2 is a schematic side view of an optical unit according to one embodiment of the present invention.

FIG. 2 is a side view which schematically illustrates the optical unit 1 of the present embodiment. As illustrated in FIG. 2, the optical unit 1 of the present embodiment includes: a reflection unit 200 including a prism 10 which serves as a reflection portion, and a camera 104 including a circuit board 103 on which an imaging element 103a is provided, and a lens 102. The reflection unit 200 allows a light flux to be incident from the outside in the incident direction D1 via the lens 101, and reflects the incident light flux in a reflection direction D2, which is the direction toward the imaging element 103a, by a reflection surface 10a of the prism 10. Although the reflection unit 200 of the present embodiment is provided with the prism 10 as the reflection portion, the configuration of the reflection portion is not limited to the prism 10. That is, the reflection unit 200 may, for example, employ a configuration including a mirror as the reflection portion.

Configuration of Reflection Unit

Figure 3:
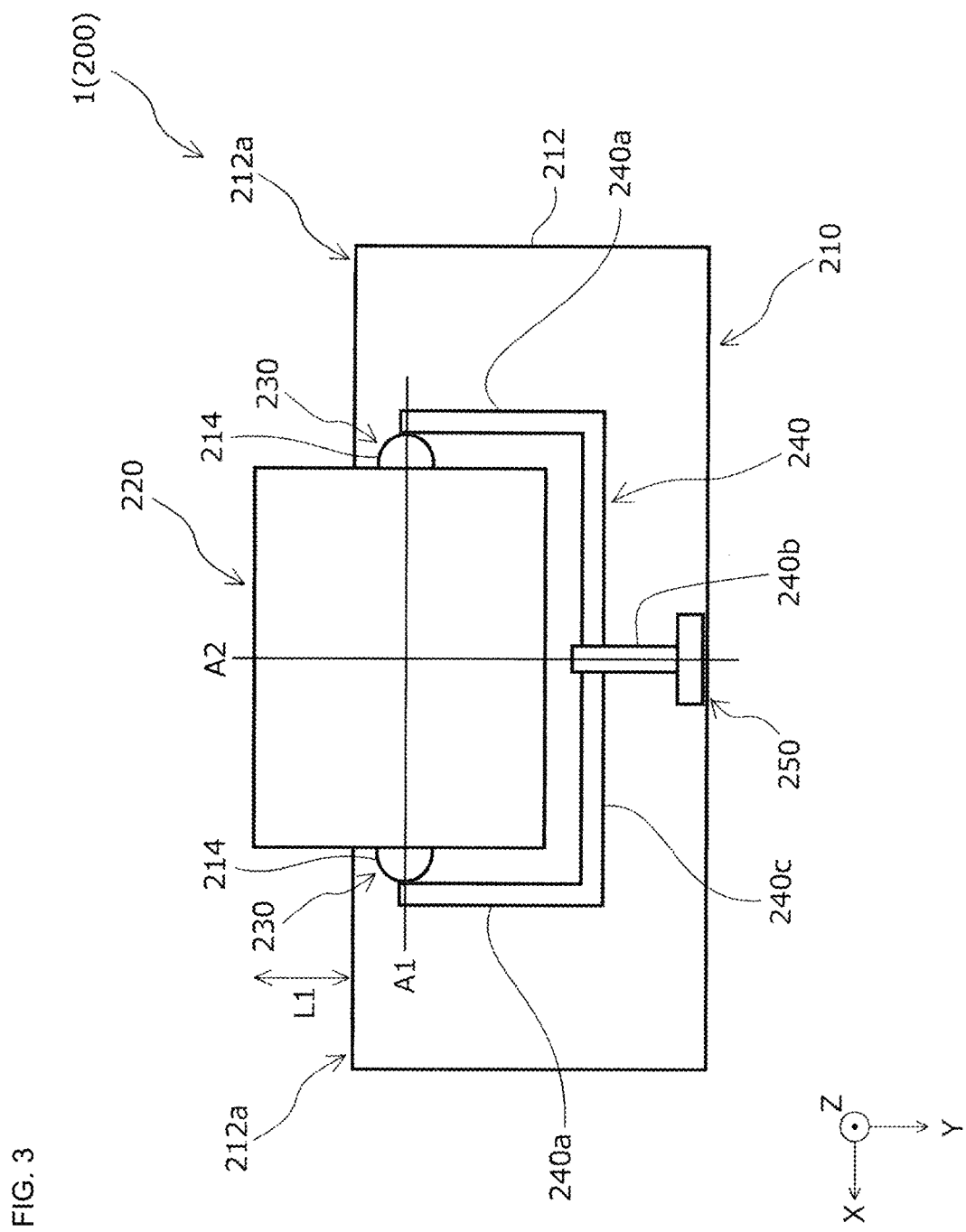
FIG. 3 is a schematic front view of an optical unit according to one embodiment of the present invention.
Figure 4:
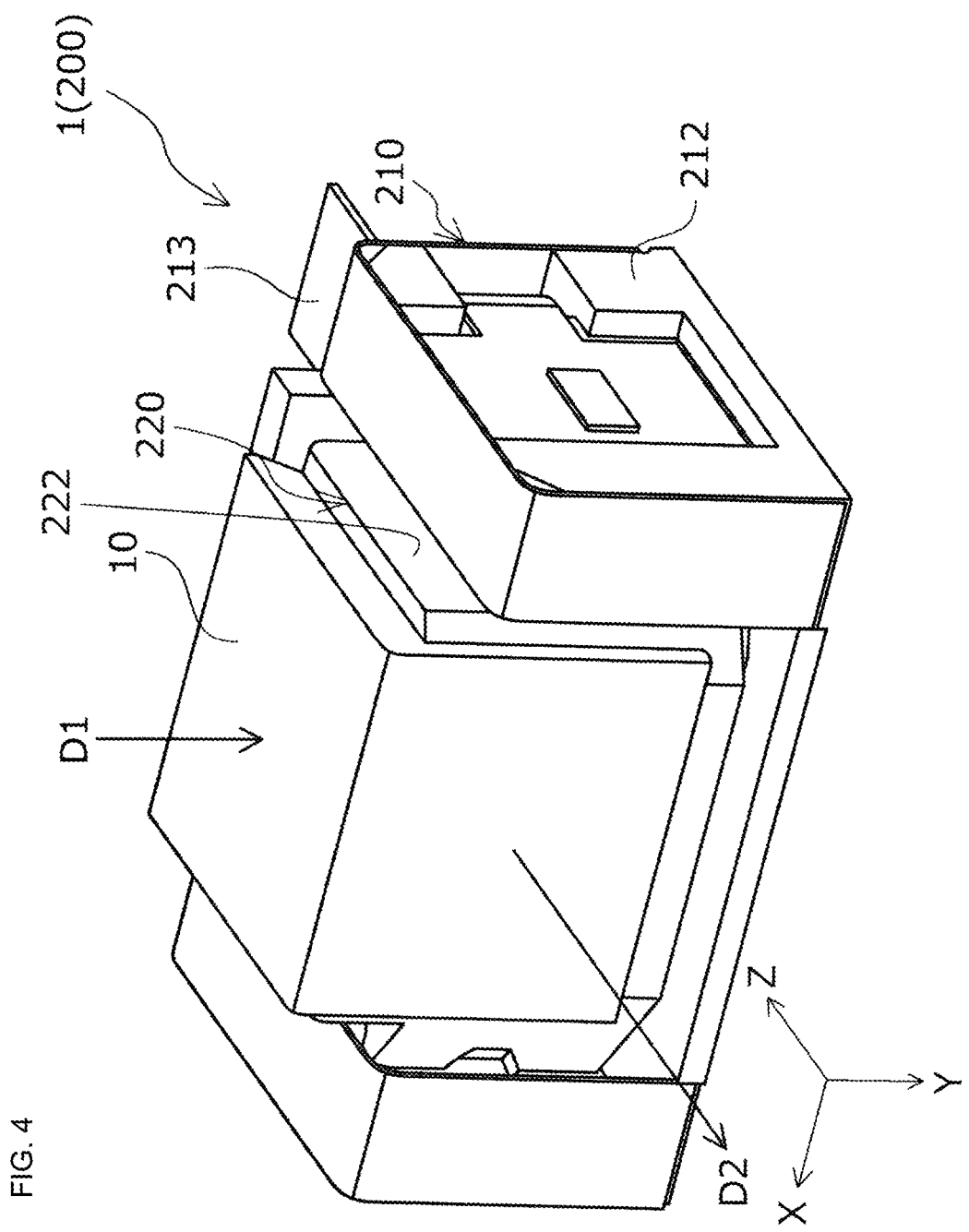
FIG. 4 is a perspective view of an optical unit according to one embodiment of the present invention.
Figure 5:
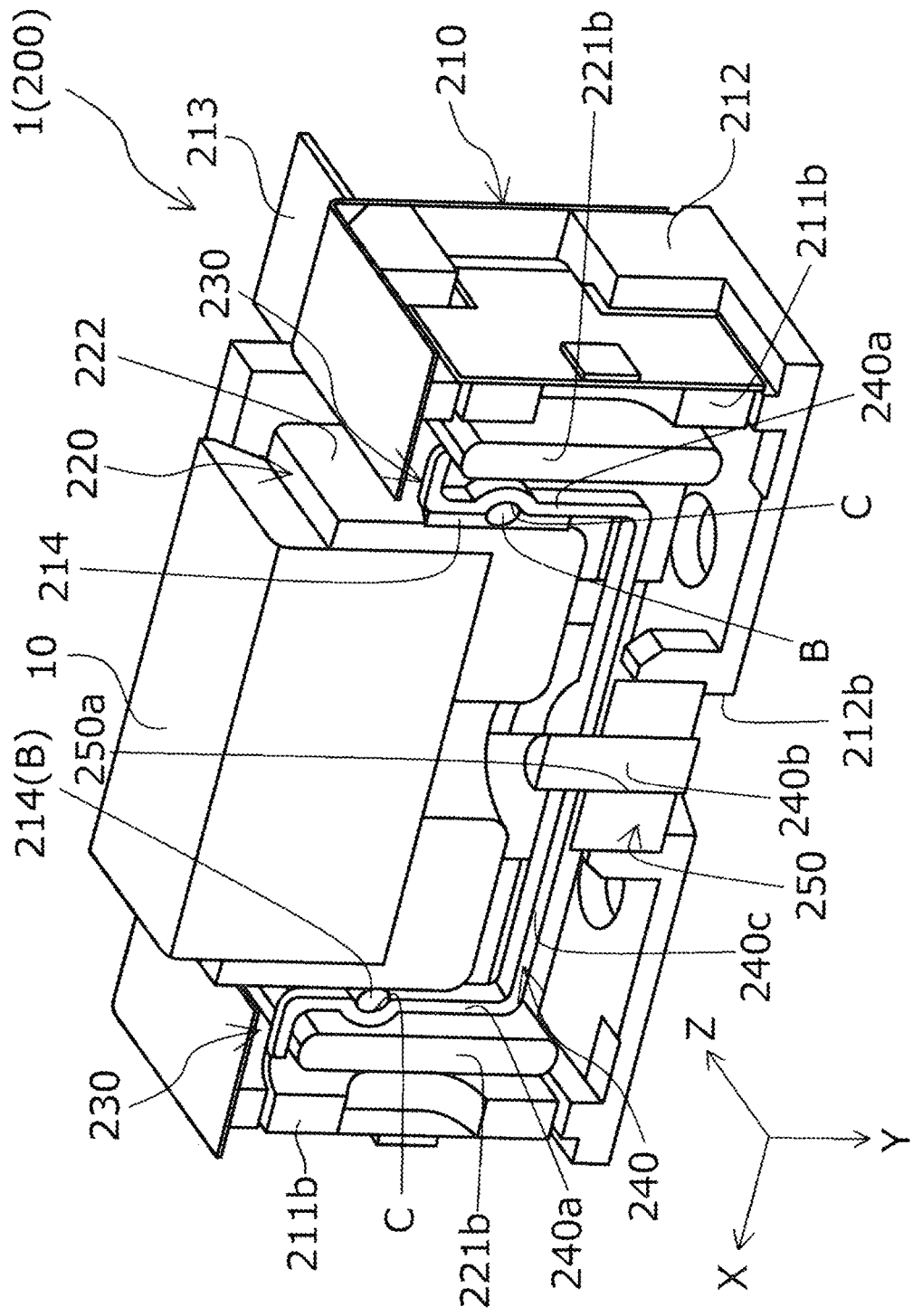
FIG. 5 is a perspective cross-sectional view of an optical unit according to one embodiment of the present invention.
Figure 6:
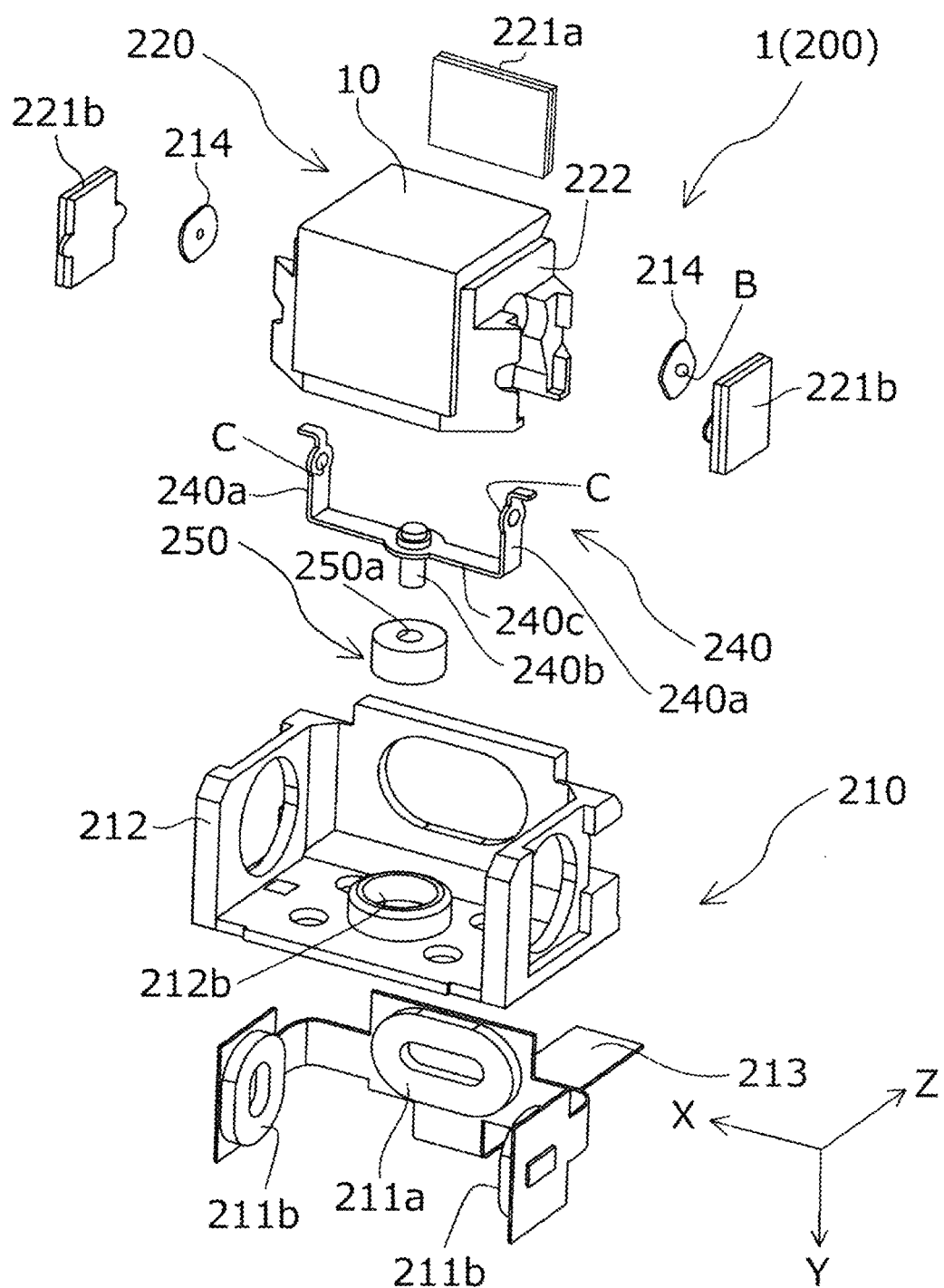
FIG. 6 is an exploded perspective view of an optical unit according to one embodiment of the present invention.

FIG. 3 is a front view which schematically illustrates an internal configuration and the like of the reflection unit 200 of the optical unit 1 of the present embodiment. Further, FIG. 4 is a perspective view of the reflection unit 200 of the optical unit 1 of the present embodiment. Furthermore, FIG. 5 is a cross-sectional view of the reflection unit 200 of the optical unit 1 of the present embodiment as seen from the same direction as in FIG. 4. Furthermore, FIG. 6 is an exploded perspective view of the reflection unit 200 of the optical unit 1 of the present embodiment. As illustrated in FIGS. 3, 5, and 6, the reflection unit 200 comprises: a fixed body 210; a movable body 220 provided with the prism 10; a gimbal mechanism 240; and a bearing mechanism 250.

Regarding Gimbal Mechanism

As the configuration of the reflection unit 200, first, the configuration of the gimbal mechanism 240 will be described. The "gimbal mechanism" in the present specification refers to a configuration which can be swung (rotated) about an axis at an engagement part (a holding mechanism 230 in the present embodiment) where engagement is established with an object to be engaged (the movable body 220 in the present embodiment). For this reason, a "plate spring", which assumes itself to be fixed and distorted at an engagement part where engagement is established with an object to be engaged, does not correspond to the "gimbal mechanism" of at least an embodiment of the present invention.

As illustrated in FIGS. 3, 5, and 6, the gimbal mechanism 240 is provided with a first support portion 240a which supports the movable body 220 swingably about a first axis A1. Also, as illustrated in FIGS. 3, 5, and 6, on the movable body 220, an engagement portion 214 which engages with the first support portion 240a is provided. Further, the first support portion 240a and the engagement portion 214 constitute the holding mechanism 230 which swingably holds the movable body 220 with respect to the gimbal mechanism 240. Specifically, as illustrated in FIGS. 5 and 6, two engagement portions 214 are both provided with a spherical projected part B, which is projected outwardly, and the corresponding first support portions 240a are provided with recessed parts C, which are recessed spherically to receive the projected parts B, respectively. By employing a configuration including the holding mechanism 230 which is configured to include a spherical member and a receiving member which receives the spherical member as described above, sliding friction can be reduced, and the movable body 220 can be swung relative to the fixed body 210 at low power consumption. Note that as the receiving member which receives the spherical member, other than the recessed part that is recessed spherically, a circular hole part, for example, may be employed.

Also, in the optical unit 1 of the present embodiment, as illustrated in FIGS. 3, 5, and 6, the gimbal mechanism 240 includes a rod-shaped frame portion 240c, which is provided with the first support portions 240a at both end portions thereof, and is parallel to an X-axis, Z-axis plane. Further, at the central portion of the frame portion 240c shaped like a rod, a columnar support shaft 240b which is connected to the bearing mechanism 250 is provided.

Regarding Bearing Mechanism

In the optical unit 1 of the present embodiment, the bearing mechanism 250 is ring-shaped when viewed from the Y-axis direction (in plan view), is provided with an insertion port in which the support shaft 240b is inserted and supported at the center, and is provided with a plurality of balls, not shown, arranged annularly around the insertion port. Further, the bearing mechanism 250 is fixed to a bearing mechanism mounting portion 212b provided on a fixed frame 212 of the fixed body 210 illustrated in FIGS. 5 and 6.

The gimbal mechanism 240 with the support shaft 240b being inserted into an insertion port 250a of the bearing mechanism 250, which is fixed to the bearing mechanism mounting portion 212b, is swingable (rotatable) relative to the fixed body 210, with the Y-axis direction, which is the insertion direction of the gimbal mechanism 240, being a swing axis (rotation axis). If the above is to be expressed differently, the gimbal mechanism 240 is swingable relative to the fixed body 210 about a second axis A2 along the Y-axis direction (direction intersecting the first axis A1 direction).

As described above, the optical unit 1 of the present embodiment comprises: the gimbal mechanism 240 provided with the first support portions 240a which support the movable body 220 swingably about the first axis A1; and the bearing mechanism 250 which supports the gimbal mechanism 240 swingably relative to the fixed body 210 about the second axis A2 intersecting the first axis A1 direction. The optical unit 1 of the present embodiment has the configuration which swingably (rotatably) supports the movable body 220 relative to the fixed body 210 with two axes in the gimbal mechanism 240 and the bearing mechanism 250 as described above. By virtue of this configuration, the optical unit 1 of the present embodiment enables the movable body 220 provided with the prism 10 to be displaced greatly relative to the fixed body 210. Also, by employing the configuration including the gimbal mechanism 240, the movable body 220 can be held in a floating state relative to the fixed body 210, and thus the optical unit 1 of the present embodiment is resistant to impact.

Further, as the configuration which enables the movable body 220 provided with the prism 10 to be displaced greatly relative to the fixed body 210, a configuration which swingably supports the movable body 220 relative to the fixed body 210 by the gimbal mechanism 240 with two intersecting axes is considered. However, in a case where a thin optical unit 1 is to be formed, it may be difficult to configure a magnetic circuit constituted of a coil and a magnet if the above configuration, i.e., the configuration which swingably supports the movable body 220 relative to the fixed body 210 by the gimbal mechanism 240 with the two intersecting axes, is employed. The reason is that an arrangement space for the coil and the magnet becomes small. However, as in the optical unit 1 of the present embodiment, by employing the configuration which swingably supports the movable body 220 relative to the fixed body 210 by the gimbal mechanism 240 with one axis, and swingably supports the movable body 220 relative to the fixed body 210 by the bearing mechanism 250 with another axis, it becomes easy to secure an arrangement space for the coil and the magnet, and a magnetic circuit is easily configured even in a case where a thin optical unit 1 is to be formed.

Also, in the optical unit 1 of the present embodiment, the gimbal mechanism 240 is arranged such that the movable body 220 can be swung with reference to a pitching axis (X-axis) that intersects a rolling axis (Z-axis) along the reflection direction D2 (−Z direction), and the bearing mechanism 250 is arranged such that the gimbal mechanism 240 can be swung with reference to a yawing axis (Y-axis) that intersects the rolling axis and also the pitching axis. By such a configuration, the movable body 220 can be greatly displaced relative to the fixed body 210 with the pitching axis and the yawing axis being the swing axes. Also, by such a configuration, a shoulder portion 212a in front view of the fixed frame 212 can be recessed to form this portion thin, as illustrated in FIG. 3. Note that in the optical unit 1 of the present embodiment, the first axis A1, which is the swing axis of the gimbal mechanism 240, is along the pitching axis direction (X-axis direction), and the second axis A2, which is the swing axis of the bearing mechanism 250, is along the yawing axis direction (Y-axis direction). However, the configuration is not limited to that described above. Depending on the configuration of the gimbal mechanism 240 and the bearing mechanism 250, the direction of holding the movable body 220 by the gimbal mechanism 240 and the direction of holding the gimbal mechanism 240 by the bearing mechanism 250 may be deviated from a swing axis direction of the movable body 220, i.e., the direction of swinging the movable body 220 by the gimbal mechanism 240, and a swing axis direction of the gimbal mechanism 240, i.e., the direction of swinging the gimbal mechanism 240 by the bearing mechanism 250. If the above is to be expressed differently, the first axis A1 and the second axis A2 may represent directions deviated from the pitching axis direction (X-axis direction) and the yawing axis direction (Y-axis direction).

However, at least an embodiment of the present invention is not limited to the above-described configuration. For example, the position of the bearing mechanism 250 may be changed, and it is possible to employ such a configuration as to arrange the gimbal mechanism 240 to allow the movable body 220 to swing with reference to the pitching axis that intersects the rolling axis along the reflection direction D2 as in the optical unit 1 of the present embodiment, and to arrange the bearing mechanism 250 to allow the gimbal mechanism 240 to swing with reference to the rolling axis. By the configuration as described above, the movable body 220 can be greatly displaced relative to the fixed body 210 with the pitching axis and the yawing axis being the swing axes, and furthermore, the shoulder portion in front view of the fixed frame 212 can be recessed to be thinly formed.

Also, as described above, in the optical unit 1 of the present embodiment, the gimbal mechanism 240 includes the rod-shaped frame portion 240c which is provided with the first support portions 240a and is parallel to the X-axis, Z-axis plane. Further, the optical unit 1 of the present embodiment includes the first support portions 240a each shaped like an arm at both ends of the frame portion 240c. By employing such a configuration, it becomes easy to adjust the arrangement of the arm-shaped first support portions 240a with respect to the frame portion 240c, and the effect of manufacturing tolerance of the gimbal mechanism 240 can thereby be easily reduced.

Regarding Drive Mechanism of Movable Body

As the configuration of the reflection unit 200, the configuration of the movable body 220 will be described next. As illustrated in FIGS. 5 and 6, the movable body 220 includes, in addition to the prism 10 and the engagement portion 214, magnets 221a and 221b on a holder frame 222. The magnet 221a is provided on the +Z direction side (rearward side in the reflection direction D2) from the prism 10, and the magnet 221b is provided on each of the +X direction side and the −X direction side from the prism 10.

Meanwhile, as illustrated in FIGS. 4 to 6, the fixed body 210 includes coils 211a and 211b, which are electrically connected to a flexible flat cable (FFC) 213, on the fixed frame 212. The coil 211a is provided at a position opposed to the magnet 221a, and the coil 211b is provided at a position opposed to the magnet 221b. In the present embodiment, the coils 211a and 211b are configured as wound coils as an example. However, alternatively, a pattern circuit board (a coil circuit board) in which a coil is incorporated into circuit board wiring as a pattern may be employed. In the optical unit 1 of the present embodiment, the position of the movable body 220 can be changed relative to the fixed body 210 by applying a current to the coils 211a and 211b. Further, the magnets 221a and 221b, the coils 211a and 211b, the holding mechanism 230, and the bearing mechanism 250 constitute a movable mechanism which allows the movable body 220 to move relative to the fixed body 210.

Further, in the optical unit 1 of the present embodiment, the movable mechanism which allows the movable body 220 to move relative to the fixed body 210 includes the magnets 221a and 221b provided on the movable body 220, and the coils 211a and 211b, which are provided at positions opposed to the magnets 221a and 221b, on the fixed body 210. By employing such a configuration, the movable mechanism can be formed easily, and the configuration prevents the FFC 213, which serves as the cable connected to the coils 211a and 211b, for example, from obstructing the mobility of the movable body 220.

Here, as illustrated in FIG. 6, in the optical unit 1 of the present embodiment, the movable mechanism includes: one first magnet 221a provided on the rearward side of the movable body 220 in the reflection direction D2 with respect to the prism 10; and a total of two second magnets 221b, which are smaller than the first magnet 221a, provided on both of intersecting direction sides, which intersect the reflection direction D2, of the movable body 220 with respect to the prism 10. The reason why the second magnet 221b is made smaller than the first magnet 221a is that a space in which the second magnet 221b can be arranged is small. Note that the fixed body 210 includes one coil 211a corresponding to the first magnet 221a, and two coils 211b corresponding to the two second magnets 221b. If one magnet is merely made small, the performance of the movable mechanism may be lowered. However, the optical unit 1 of the present embodiment employs a configuration in which two second magnets 221b are provided. This configuration thereby prevents the performance of the movable mechanism from being lowered due to the optical unit 1 being formed thin in the incident direction D1.

In the following, details of the bearing mechanism mounting portion 212b in the optical unit 1 of the present embodiment will be described with reference to FIGS. 7 and 8, and FIGS. 12 and 13 representing reference examples of a conventionally used bearing mechanism mounting portion 212b. First, an example of a conventional bearing mechanism mounting portion 212b illustrated in FIG. 12 will be described.

Figure 12:
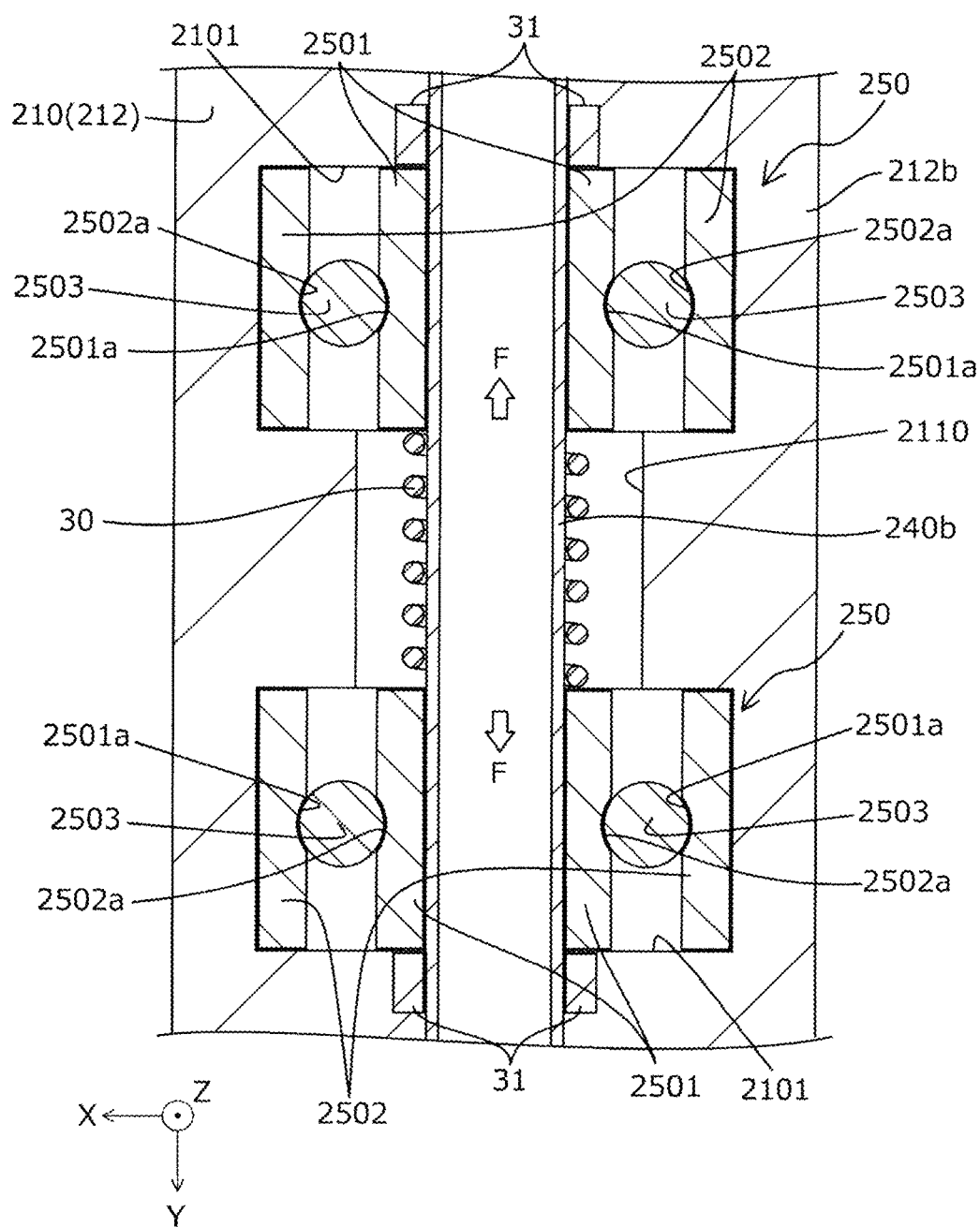
FIG. 12 is a schematic cross-sectional view of a bearing mechanism and a bearing mechanism mounting portion generally used.

In the bearing mechanism mounting portion 212b illustrated in FIG. 12, a coil spring 30 housed in a coil spring housing portion 2110 is sandwiched between two bearing mechanisms 250 housed in respective housings 2101, a stopper 31 is provided on both of the outer sides of the two bearing mechanisms 250, and each of the two bearing mechanisms 250 is pressed toward the stopper 31 by elastic force of the coil spring 30. The bearing mechanism mounting portion 212b is thereby configured to enable a preload to be applied to the bearing mechanisms 250 in directions F of the drawing. The two bearing mechanisms 250 described above both have a structure similar to that of the bearing mechanism 250 of the present embodiment, which is that an inner ring 2501 is fixed to a support shaft 240b by adhesive bonding, and an outer ring 2502 is fixed to the housing 2101 formed in a fixed body 210 by press fitting or clamping. In this structure, a plurality of balls 2503 are disposed between the inner ring 2501 and the outer ring 2502. A circumferential groove 2501a is formed on a surface in contact with the ball 2503 of the inner ring 2501, and a circumferential groove 2502a is formed on a surface in contact with the ball 2503 of the outer ring 2502. The ball 2503 can roll around at a position opposed to the groove 2501a and the groove 2502a.

However, since the bearing mechanism mounting portion 212b illustrated in FIG. 12 is configured to use the two bearing mechanisms 250 to sandwich the coil spring 30, the size tends to be increased and the structure becomes complicated. Therefore, an alternative configuration is to use a single bearing mechanism 250, as in the bearing mechanism mounting portion 212b illustrated in FIG. 13. Next, the bearing mechanism mounting portion 212b illustrated in FIG. 13 will be described.

Figure 13:
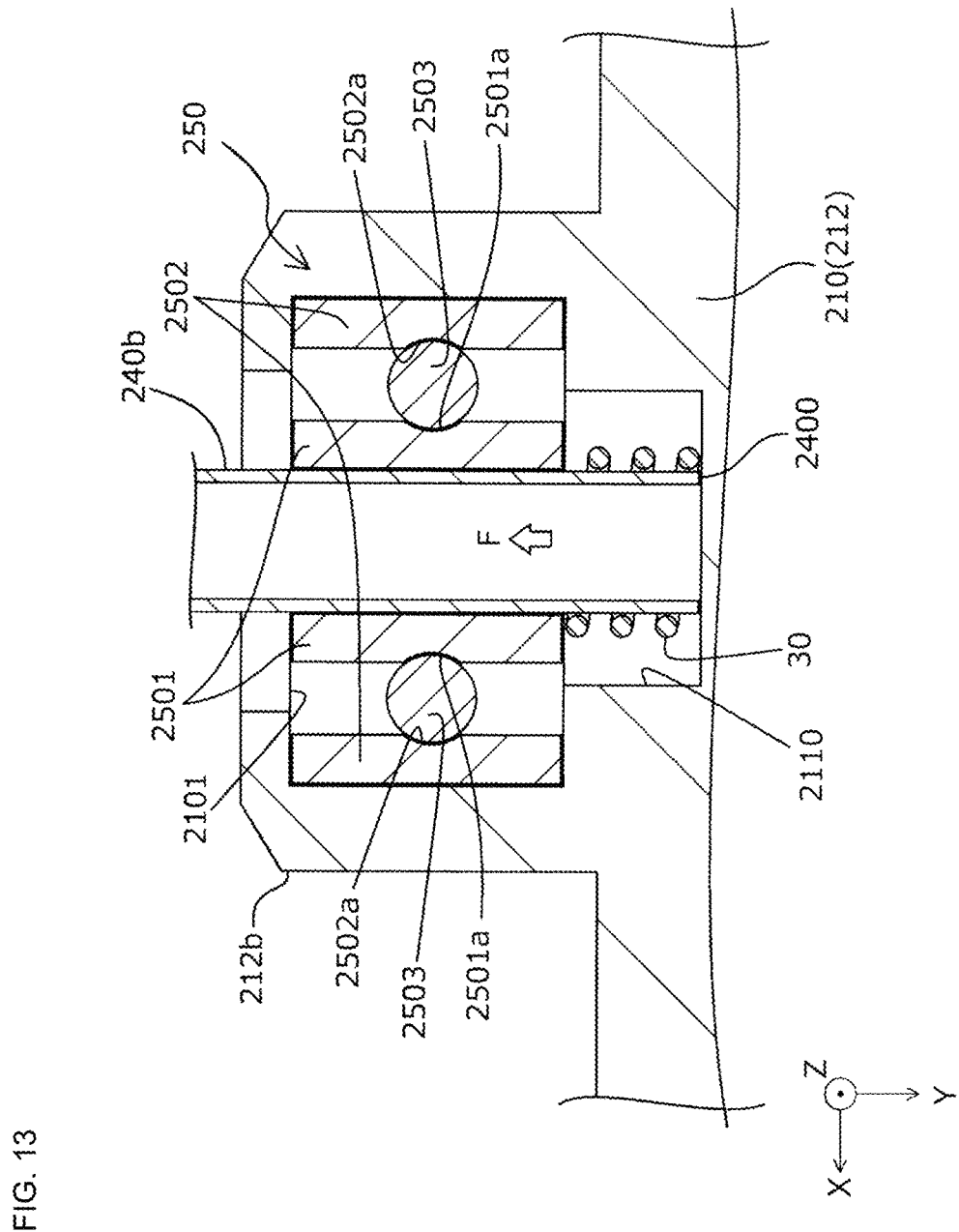
FIG. 13 is a schematic cross-sectional view of a bearing mechanism and a bearing mechanism mounting portion generally used that are different from the bearing mechanism and the bearing mechanism mounting portion of FIG. 12.

The bearing mechanism mounting portion 212b illustrated in FIG. 13 is configured to press an end portion of the bearing mechanism 250 by using a coil spring 30 housed in a coil spring housing portion 2110, thereby enabling a preload to be applied to the bearing mechanism 250 in direction F of the drawing. However, with the bearing mechanism mounting portion 212b illustrated in FIG. 13, since the coil spring 30 is rubbed against the coil spring housing portion 2110 and a support shaft 240b, sliding resistance is caused, and a preload cannot be effectively applied to the bearing mechanism 250. Since the configuration of the bearing mechanism 250 illustrated in FIG. 13, and a method of fixing an inner ring 2501 to the support shaft 240b and a method of fixing an outer ring 2502 to a housing 2101 are the same as those of the bearing mechanism mounting portion 212b illustrated in FIG. 12, explanation of the above is omitted.

Figure 7:
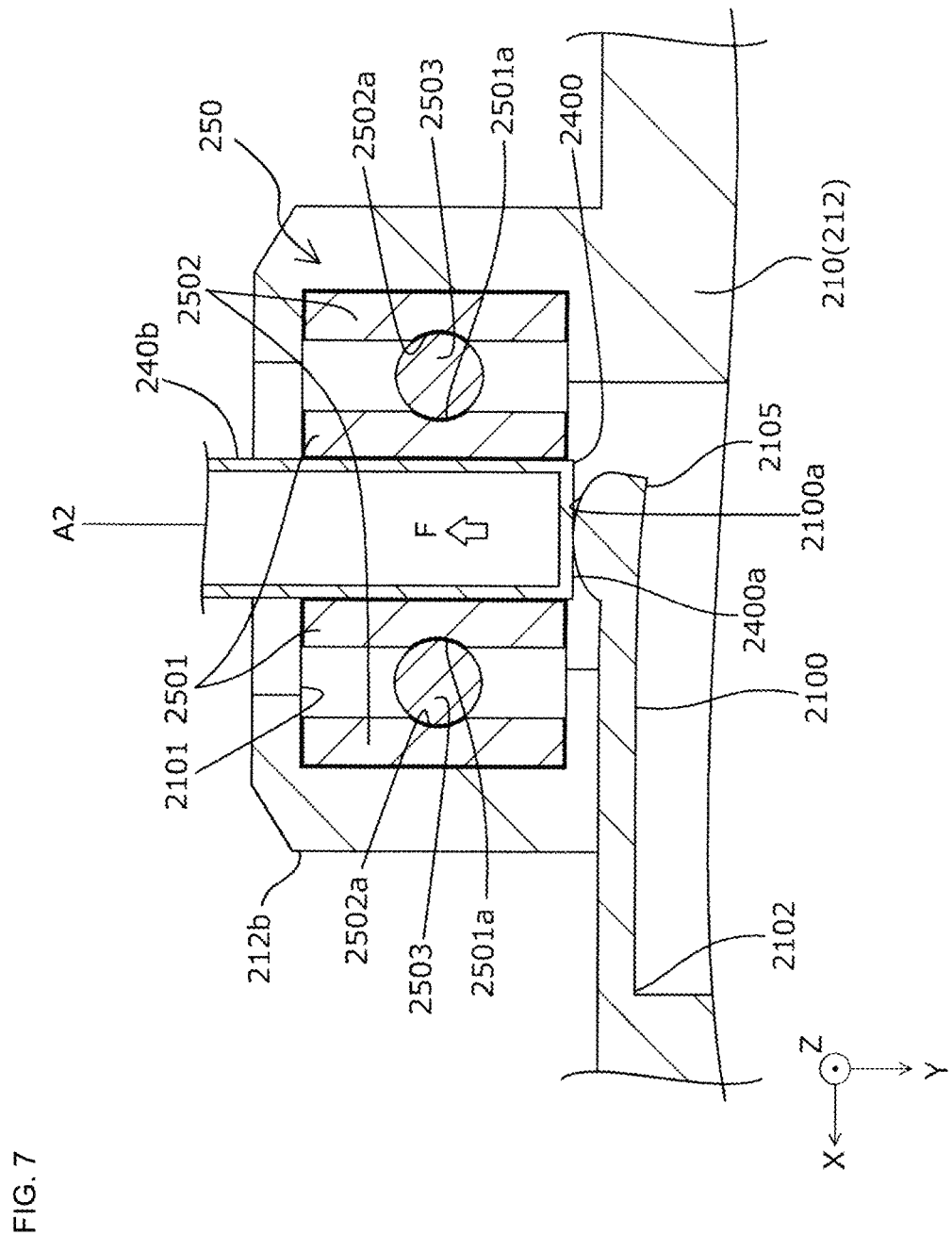
FIG. 7 is a schematic cross-sectional view of a bearing mechanism and a bearing mechanism mounting portion of an optical unit according to one embodiment of the present invention.
Figure 8:
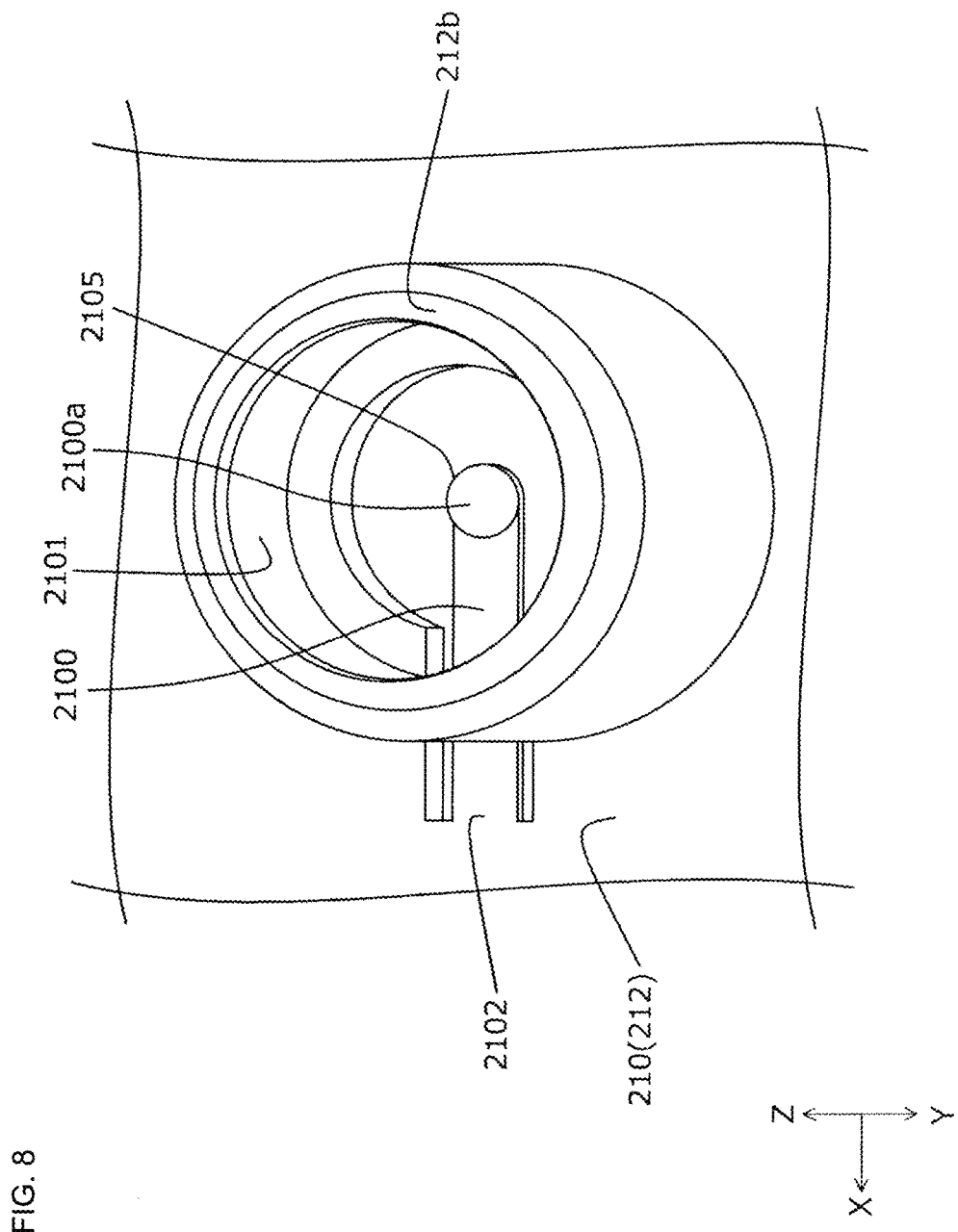
FIG. 8 is a schematic perspective view of a bearing mechanism mounting portion of an optical unit according to one embodiment of the present invention.

In contrast, the bearing mechanism mounting portion 212b of the present embodiment illustrated in FIGS. 7 and 8 is provided with a plate spring 2100, which serves as a preload generating member that presses a bottom part 2400 of the support shaft 240b in direction F as shown in FIG. 7. As can be seen, by employing a configuration which presses the bottom part 2400 of the support shaft 240b, it is possible to prevent the preload generating member from being rubbed against a housing portion thereof and the support shaft 240b, and a preload can be effectively applied to the bearing mechanism 250. Since the configuration of the bearing mechanism 250 illustrated in FIGS. 7 and 8, and a method of fixing an inner ring 2501 to the support shaft 240b and a method of fixing an outer ring 2502 to a housing 2101 are the same as those of the bearing mechanism mounting portions 212b illustrated in FIGS. 12 and 13, explanation of the above is omitted.

Here, to summarize, in the optical unit 1 of the present embodiment, the gimbal mechanism 240 includes the support shaft 240b extending along the second axis A2, and the bearing mechanism 250 includes the inner ring 2501 fixed to the support shaft 240b and the outer ring 2502 fixed to the housing 2101 formed in the fixed body 210. Further, the fixed body 210 includes the plate spring 2100, which serves as the preload generating member that presses the bottom part 2400 corresponding to an end portion of the support shaft 240b along the second axis A2 relative to the housing 2101. Because the optical unit 1 of the present embodiment has the above-described configuration, a preload can be effectively applied to the bearing mechanism 250 with a simple and inexpensive structure.

As described above, the preload generating member of the present embodiment corresponds to the plate spring 2100 as an elastic member. If the above is to be expressed differently, a part of the fixed body 210 is used to constitute the preload generating member without increasing the number of new components. By employing such a configuration, the preload generating member can be easily and inexpensively configured without increasing the number of components such as by newly preparing a coil spring.

As described above, although the support shaft 240b has a columnar shape, specifically, as illustrated in FIG. 7, the support shaft 240b has a cylindrical shape with a cavity inside, and includes a flat portion 2400a at the bottom part 2400. Further, as illustrated in FIG. 7, a projection part 2100a of the plate spring 2100, which serves as a contact part to be in contact with the support shaft 240b, is in contact with the flat portion 2400a. Note that in the present embodiment, although the bottom part 2400 has the flat portion 2400a, the bottom part 2400 may be provided with a recessed part having a curvature smaller than that of the projection part 2100a. As described above, a configuration in which the contact part includes the projection part 2100a, and the support shaft 240b comes into contact with the projection part 2100a with a flat surface or a recessed part having a curvature smaller than that of the projection part 2100a is employed. Thereby, a preload can be applied to a single point on a rotating shaft, and even if a center deviation, for example, of a bearing resulting from the component accuracy or the like of the bearing mechanism 250 occurs, it is possible to prevent unnecessary load from being exerted.

Figure 9:
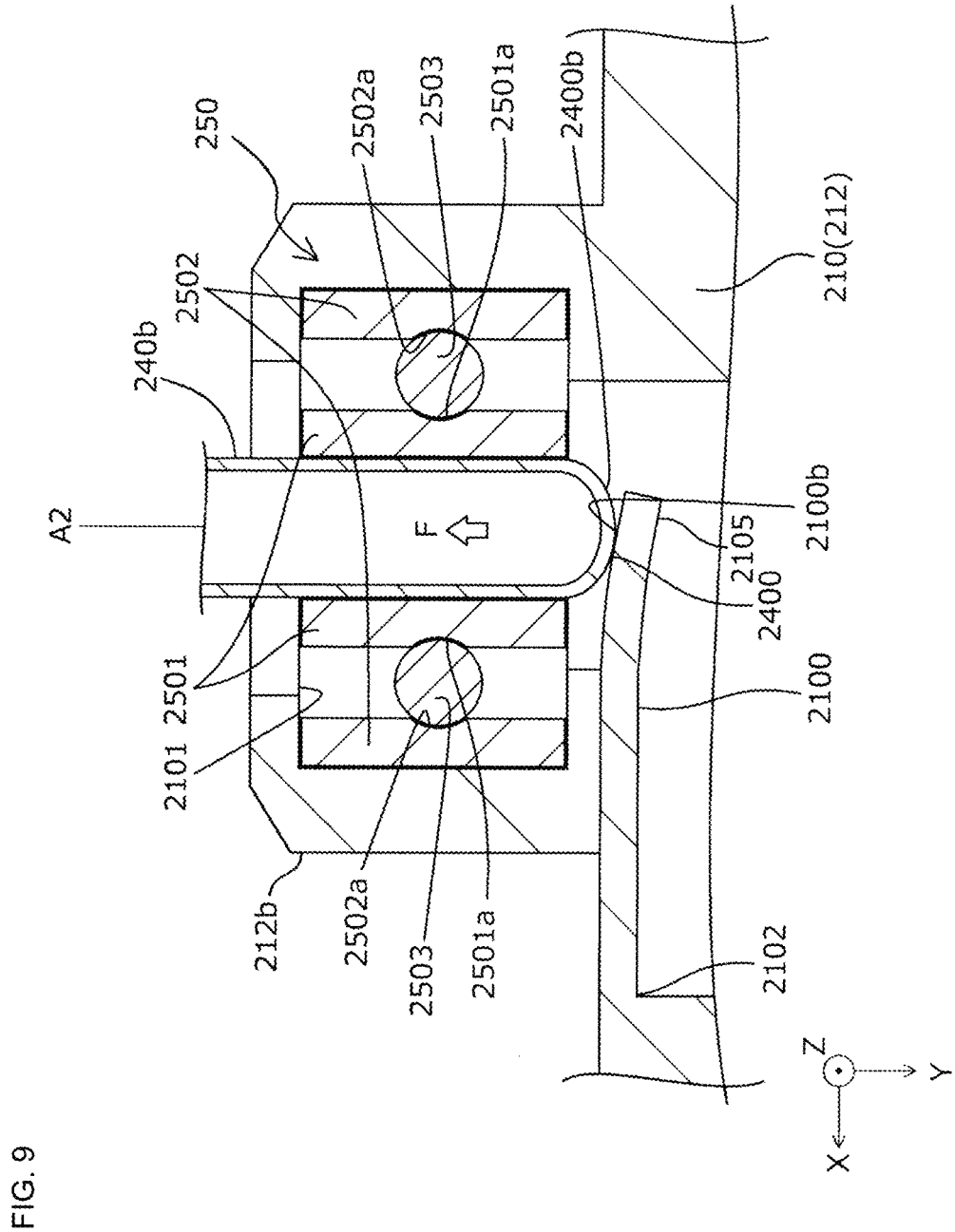
FIG. 9 is a schematic cross-sectional view of a bearing mechanism and a bearing mechanism mounting portion, which are different from those of FIGS. 7 and 8, in an optical unit according to one embodiment of the present invention.

A bearing mechanism mounting portion 212b of a structure, which is different from the structure of the bearing mechanism mounting portion 212b of the present embodiment illustrated in FIGS. 7 and 8, will be described below with reference to FIG. 9. FIG. 9 is a drawing corresponding to FIG. 7. Note that the bearing mechanism mounting portion 212b illustrated in FIG. 9 has a structure similar to that of the bearing mechanism mounting portion 212b illustrated in FIGS. 7 and 8, except for the parts described below, and has the same feature as that of the bearing mechanism mounting portion 212b illustrated in FIGS. 7 and 8.

In the optical unit provided with the bearing mechanism mounting portion 212b illustrated in FIG. 9, the support shaft 240b includes a projection part 2400b, and a contact part to be in contact with the support shaft 240b of the plate spring 2100 has a flat portion 2100b. Note that in the present embodiment, although the contact part to be in contact with the support shaft 240b has the flat portion 2100b, the contact part may be provided with a recessed part having a curvature smaller than that of the projection part 2400b. As described above, a configuration in which the support shaft 240b includes the projection part 2400b, and the contact part to be in contact with the support shaft 240b comes into contact with the projection part 2400b with a flat surface or a recessed part having a curvature smaller than that of the projection part 2400b is employed. Thereby, a preload can be applied to a single point on a rotating shaft, and even if a center deviation, for example, of a bearing resulting from the component accuracy or the like of the bearing mechanism 250 occurs, it is possible to prevent unnecessary load from being exerted.

The optical unit 1 illustrated in FIGS. 7 and 8, and the optical unit 1 illustrated in FIG. 9 both employ a configuration in which the plate spring 2100 is fixed to the fixed body 210 at one end portion 2102, and presses, with the contact part provided at the other end portion 2105, the bottom part 2400 corresponding to the end portion of the support shaft 240b along the second axis A2 relative to the housing 2101. By such a configuration, a preload that is not too strong can be applied to the bearing mechanism 250. Moreover, the preload can be applied to a single point on the rotating shaft, and sliding resistance can be minimized even if a strong preload is applied. However, at least an embodiment of the present invention is not limited to the above-described configuration.

Figure 10:
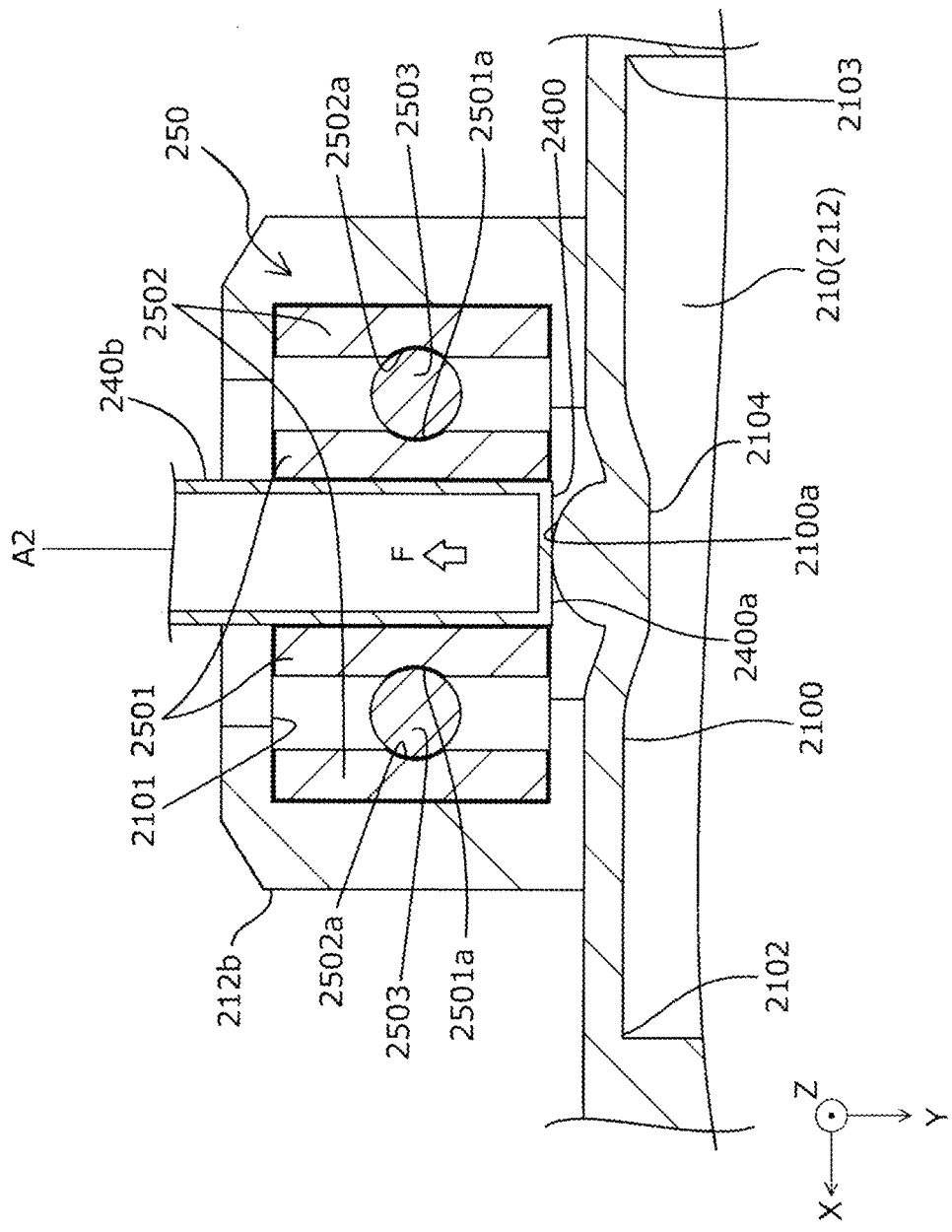
FIG. 10 is a schematic cross-sectional view of a bearing mechanism mounting portion, which is different from that of FIGS. 7, 8, and 9, in an optical unit according to one embodiment of the present invention.
Figure 11:
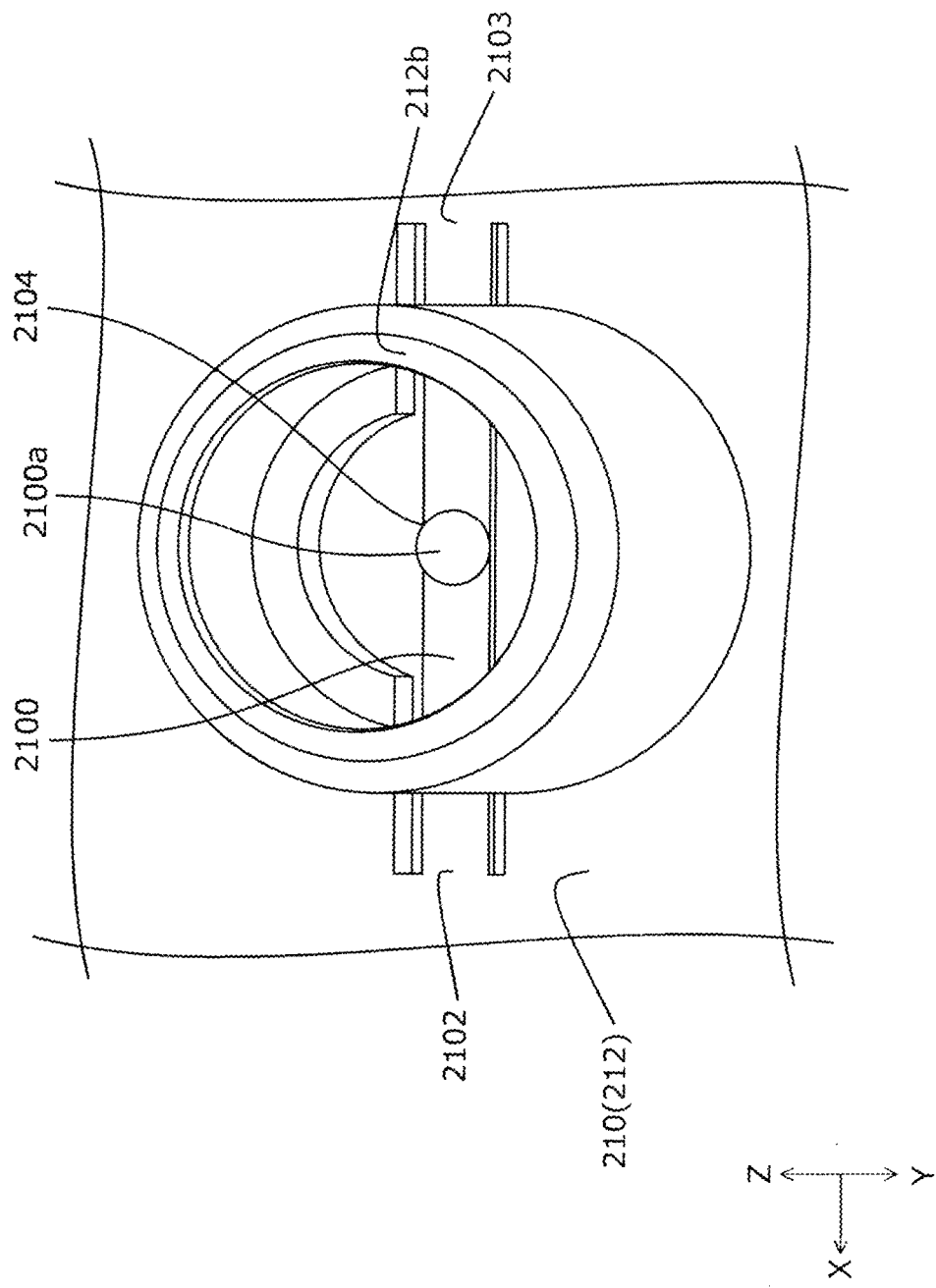
FIG. 11 is a schematic perspective view of the bearing mechanism mounting portion of FIG. 10.

A bearing mechanism mounting portion 212b of a structure, which is different from the structure of the bearing mechanism mounting portion 212b of the present embodiment illustrated in FIGS. 7 and 8, or the bearing mechanism mounting portion 212b of the present embodiment illustrated in FIG. 9, will be described below with reference to FIGS. 10 and 11. FIG. 10 is a drawing corresponding to FIG. 7, and FIG. 11 is a drawing corresponding to FIG. 8. Note that the bearing mechanism mounting portion 212b illustrated in FIGS. 10 and 11 has a structure similar to that of the bearing mechanism mounting portion 212b illustrated in FIGS. 7 and 8, and the bearing mechanism mounting portion 212b illustrated in FIG. 9, except for the parts described below, and has the same feature as that of the bearing mechanism mounting portion 212b illustrated in FIGS. 7 and 8, and the bearing mechanism mounting portion 212b illustrated in FIG. 9.

In the optical unit provided with the bearing mechanism mounting portion 212b illustrated in FIGS. 10 and 11, the plate spring 2100 is configured to be fixed to the fixed body 210 at end portions 2102 and 2103 in a plurality of directions, and to press, with a projection part 2100a which serves as a contact part provided at a position 2104 different from the positions of the end portions 2102 and 2103 in the plurality of directions, the bottom part 2400 corresponding to the end portion of the support shaft 240b along the second axis A2 relative to the housing 2101. By employing such a configuration, a strong preload can be applied to the bearing mechanism 250, and sliding resistance can also be minimized even if a strong preload that is necessary is applied. In the present embodiment, while the plate spring 2100 is fixed to the fixed body 210 at two places, i.e., at the end portions 2102 and 2103, the plate spring 2100 may be fixed to the fixed body 210 at three or more places.

Note that as illustrated in FIGS. 7 and 9, in the bearing mechanism 250 illustrated in FIGS. 7 and 8, and the bearing mechanism 250 illustrated in FIG. 9, a preload is applied to the bearing mechanism 250 not only in direction F, but also in a direction deviated from direction F diagonally. Meanwhile, in the bearing mechanism 250 illustrated in FIGS. 10 and 11, a preload is applied only in direction F. Accordingly, in the bearing mechanism 250 illustrated in FIGS. 10 and 11, the preload is applied effectively.

The present invention is not limited to the above-described embodiments, and may be realized in various configurations without departing from the spirit of the present invention. For example, the technical features exhibited in the embodiment corresponding to the technical features in each aspect of the invention described under "SUMMARY" may be replaced or combined as appropriate to solve a part of or all of the problems described above, or to achieve a part of or all of the advantageous effect described above. Further, unless the technical feature is described as being essential in the present specification, it may be omitted as appropriate.

What is claimed is:

1. An optical unit comprising:
   a reflection portion which reflects an incident light flux, which is made incident from outside, in a reflection direction toward an imaging element from an incident direction;
   a movable body comprising the reflection portion;
   a fixed body;
   a movable mechanism which allows the movable body to move relative to the fixed body;
   a gimbal mechanism comprising a first support portion which supports the movable body swingably about a first axis; and
   a bearing mechanism which supports the gimbal mechanism swingably relative to the fixed body about a second axis intersecting a direction of the first axis;
   wherein the gimbal mechanism comprises a rod-shaped frame portion, wherein a first part of the first support portion is attached to a first end of the rod-shaped frame portion, and a second part of the first support portion is attached to a second end of the rod-shaped frame portion;
   a support shaft having a columnar rode shape is attached to a central portion of the rod-shaped frame portion, wherein the support shaft extends in a direction of the second axis and is connected to the bearing mechanism;
   the support shaft is inserted into an insertion port of the bearing mechanism to permit the rod-shaped frame portion to swing relative to the fixed body, and a swing axis of the rod-shaped frame portion is in the direction of the second axis; and
   the fixed body comprises a preload generating member, wherein the preload generating member comprises an elastic member configured to press an end portion of the support shaft along the second axis relative to the housing.

2. The optical unit according to claim 1, wherein the gimbal mechanism is arranged to allow the movable body to swing with reference to a pitching axis that intersects a rolling axis along the reflection direction, and the bearing mechanism is arranged to allow the gimbal mechanism to swing with reference to a yawing axis that intersects the rolling axis and also the pitching axis.

3. The optical unit according to claim 1, wherein the movable mechanism comprises a magnet provided on the movable body, and a coil provided at a position opposed to the magnet on the fixed body.

4. The optical unit according to claim 3, wherein the movable mechanism comprises, as the magnet, a first magnet provided on a rearward side of the movable body in the reflection direction with respect to the reflection portion, and a second magnet, which is smaller than the first magnet and is provided on both of intersecting direction sides of the movable body that intersect the reflection direction with respect to the reflection portion.

5. The optical unit according to claim 1, wherein the bearing mechanism comprises an inner ring fixed to the support shaft, and an outer ring fixed to a housing formed in the fixed body.

6. The optical unit according to claim 1, wherein the elastic member is a plate spring.

7. The optical unit according to claim 6, wherein the plate spring is fixed to the fixed body at one end portion of the plate spring, and presses, with a contact part provided at an other end portion of the plate spring, the end portion of the support shaft along the second axis relative to the housing.

8. The optical unit according to claim 7, wherein the contact part comprises a projection part, and the support shaft comes into contact with the contact part with a flat surface or a recessed part having a curvature smaller than a curvature of the projection part.

9. The optical unit according to claim 7, wherein the support shaft comprises a projection part, and the contact part comes into contact with the projection part with a flat surface or a recessed part having a curvature smaller than a curvature of the projection part.

10. The optical unit according to claim 6, wherein the plate spring is fixed to the fixed body at end portions in a plurality of directions, and presses, with a contact part provided at a position different from positions of the end portions in the plurality of directions, the end portion of the support shaft along the second axis relative to the housing.

11. The optical unit according to claim 10, wherein the contact part comprises a projection part, and the support shaft comes into contact with the contact part with a flat surface or a recessed part having a curvature smaller than a curvature of the projection part.

12. The optical unit according to claim 10, wherein the support shaft comprises a projection part, and the contact part comes into contact with the projection part with a flat surface or a recessed part having a curvature smaller than a curvature of the projection part.

* * * * *